United States Patent [19]

Ichiyoshi

[11] Patent Number: 4,901,310
[45] Date of Patent: Feb. 13, 1990

[54] MOBILE SATELLITE COMMUNICATION SYSTEM

[75] Inventor: Osamu Ichiyoshi, Tokyo, Japan

[73] Assignee: NEC Corporation, Japan

[21] Appl. No.: 242,707

[22] Filed: Sep. 9, 1988

[30] Foreign Application Priority Data

Sep. 11, 1987 [JP]   Japan ................................. 62-228088

[51] Int. Cl.[4] ............................ H04J 1/02; H04J 1/10
[52] U.S. Cl. ....................................... 370/75; 370/70; 370/97
[58] Field of Search ..................... 370/75, 69.1, 70, 50, 370/104, 97

[56] References Cited

U.S. PATENT DOCUMENTS

| | | | |
|---|---|---|---|
| 4,312,062 | 1/1982 | Bellanger et al. | 370/70 |
| 4,381,562 | 4/1983 | Acampora | 370/75 |
| 4,425,639 | 1/1984 | Acampora et al. | 370/75 |
| 4,456,988 | 6/1984 | Nakagome et al. | 370/75 |
| 4,705,239 | 11/1987 | Ito et al. | 370/75 |

Primary Examiner—Robert L. Griffin
Assistant Examiner—Wellington Chin
Attorney, Agent, or Firm—Ostrolenk, Faber, Gerb & Soffen

[57] ABSTRACT

A satellite communication system includes a plurality of mobile stations which are situated on the earth and a communication satellite which is communicable with the mobile stations by radio signals over a plurality of spot beams. The satellite applies single sideband amplitude modulation (SSB-AM) to analog signals which are sent from the mobile stations, applies digital modulation to coded voice and data, and separates signals in the form of frequency-division-multiplexed (FDM) signals on a channel basis by a transmultiplexer method which is implemented by demultiplexers of a transponder. Baseband matrix means is provided for connecting an output of any of the demultiplexers to one of the spot beams to be transmitted. Further, transmitting means is provided for time-division-multiplexing outputs of the baseband matrix means to form a transmit frame and transmitting it in the form of a TDM signal. On the other hand, each mobile station includes a receiver for selecting a channel signal to be received out of the TDM signal which is sent from the transmitting means of the onboard transponder, and demodulates it to regenerate a signal.

7 Claims, 17 Drawing Sheets

Fig. 2A PRIOR ART S1 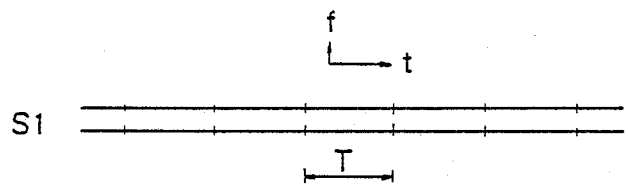
Fig. 2B PRIOR ART S5 
Fig. 2C PRIOR ART S2 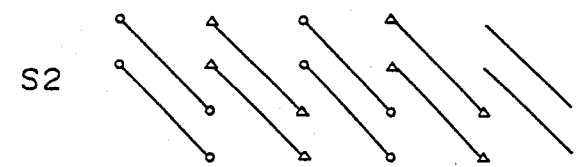
Fig. 2D PRIOR ART S3 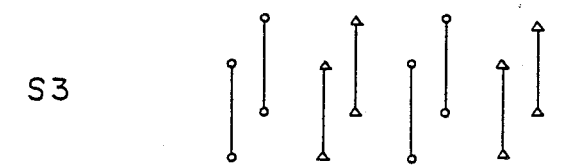
Fig. 2E PRIOR ART S6 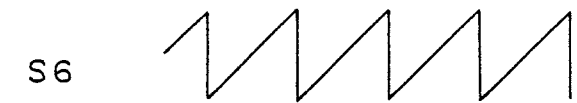
Fig. 2F PRIOR ART S4 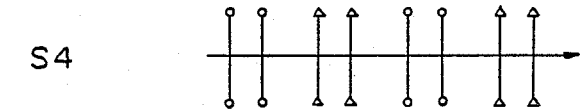

| Fig.6A | Fig.6B |

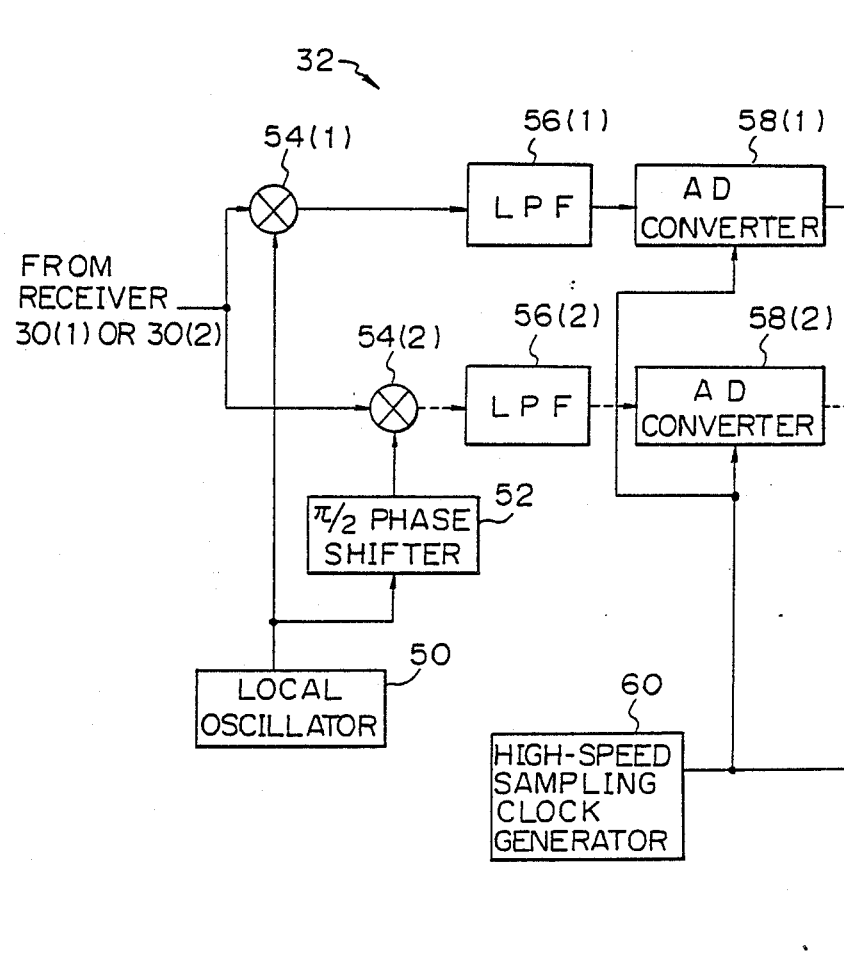

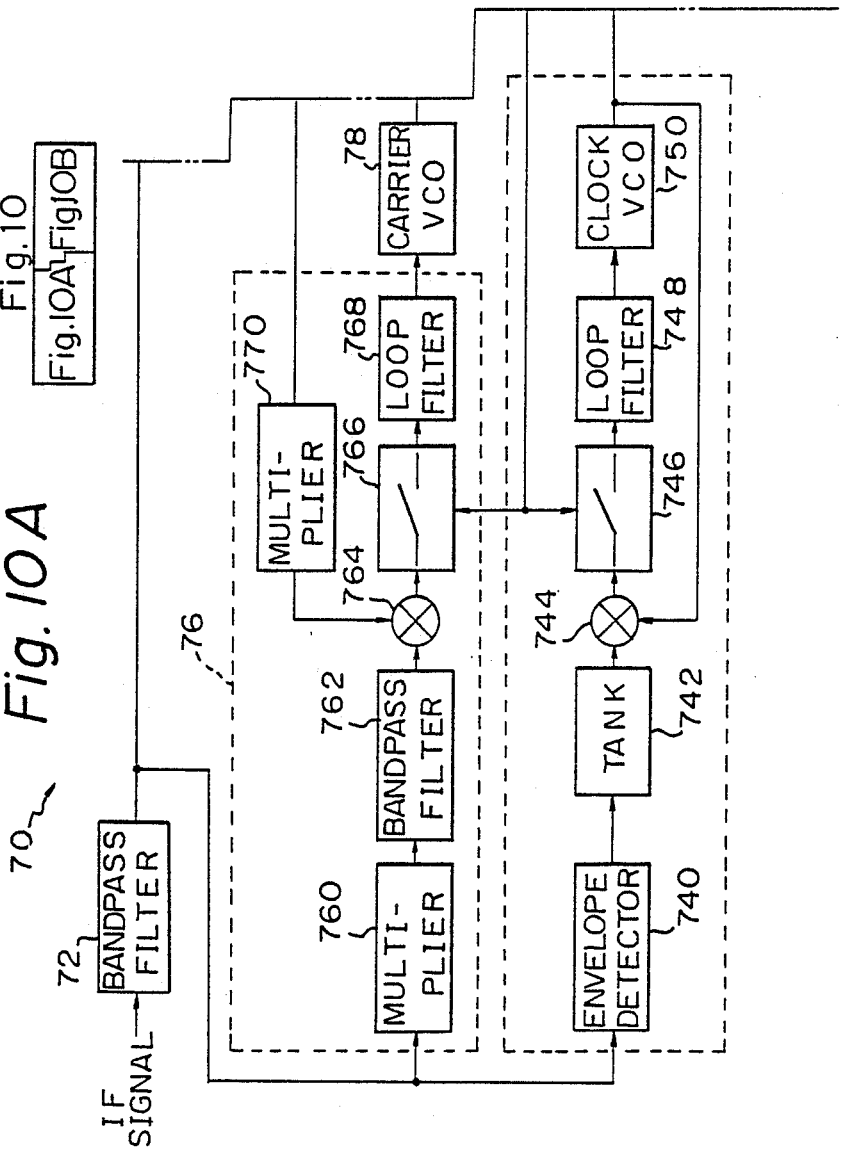

MOBILE SATELLITE COMMUNICATION SYSTEM

BACKGROUND OF THE INVENTION

The present invention relates to a mobile satellite communication system which affords voice channels and digital data channels to a number of mobile stations that are distributed over a wide area on the earth.

In parallel with the improvement in the capability of a communication satellite, a satellite communication system that allows an earth station to directly connect itself to a communication satellite with miniature antenna has been extensively developed. This kind of communication system allows the small-size configuration of an earth station, and has other various advantages. A prior art satellite communication system of the type described, however, has a problem of extremely limited output effective isotropic radiation power (EIRP) and reception gain-to-noise temperature (GT) ratio attainable with the earth station, and the problem that the frequency resources allocated to mobile station communications are scarce. The EIRP and reception GT ratio problem may be coped with by adopting spot beams which are effective in increasing the antenna gain of a satellite. Additionally, the frequency resource problem may be eliminated by adopting spot beams which promote frequency re-use and dividing a frequency band used into a number of narrow band channels. For example, NASA's MSAT (Mobil Satellite Experiment) program contemplates a method that uses eighty-seven spot beams and a method that transmits voice and data by using a channel band of 5 kilohertz. Omninet Corp of U.S.A is planning to transmit voice in a 5-kilohertz channel band by SSB-AM (Single Sideband Amplitude Modulation).

All the mobile satellite communications proposed above apply an FDM (Frequency Division Multiplex) system to both of an uplink and a downlink. Although the FDM system may be successful in simplifying the construction of a transmitter and that of a receiver of a ground station, it gives rise to cross modulation noise because it causes an onboard transponder to apply common amplification to FDM signals. To insure acceptable quality despite cross modulation, it is necessary that the operation points of an amplifier be selected with sufficient back-offs with respect to the saturation point. This brings about EIRP losses corresponding to the back-offs. One possible approach to solve this problem may be transforming FDM signals into TDM (Time Division Multiplex) signals on a satellite. For example, an onbaord FDM-TDM conversion method which relies on chirp Z transform has been proposed by Nippon Telephone and Telgraph Corp. However, the chirp Z transport principle makes the operation extremely difficult and, apparently, cannot eliminate crosstalk between various channels, or interchannel interference, in the case of transmission of analog signals.

Further, none of the mobile satellite communication systems presently under study teaches how to interconnect signals between beams on a satellite. For example, both the NASA's MSAT program and the Omninet's program cause a ground network to effect signal connection between beams via base stations that are associated with respective spot beams. Hence, the prior art systems fail to make the best use of wide coverage which is particular to satellite communications.

SUMMARY OF THE INVENTION

It is therefore an object of the present invention to provide a mobile satellite communication system that realizes up high quality voice channels and data channels for a number of mobile stations that are distributed in a wide area.

It is another object of the present invention to provide a mobile satellite communication system that maximizes the power efficiency of a satellite.

It is another object of the present invention to provide a mobile satellite communication system that allows only a minimum of interchannel interference to occur and that facilitates signal connections between spot beams.

It is another object of the present invention to provide a generally-improved mobile satellite communication system.

In a satellite communication system including a plurality of mobile stations situated on the earth and a communication satellite communicatable with the mobile stations by using radio signals over a plurality of spot beams, in accordance with the present invention, the mobile stations each comprises a transmitter for modulating voice and data to produce a frequency-division-multiplexed signal and transmitting the FDM signal to the communication satellite over any of the spot beams which is associated with the mobile station. The communication satellite comprises an onboard transponder for separating FDM signals which are sent from the mobile stations from each other and then interconnecting the spot beams to transmit signals to the mobile stations for which the FDM signals are meant.

BRIEF DESCRIPTION OF THE DRAWINGS

The above and other objects, features and advantages of the present invention will become more apparent from the following detailed description taken with the accompanying drawings, in which:

FIGS. 2A to 2F are diagrams useful for understanding the operation of the FDM-TDM transmultiplexer shown in FIG. 1;

FIGS. 6A and 6B, is a block diagram schematically showing a transponder of a communication satellite which is included in the system of FIG. 4;

FIG. 7, shown in interconnected FIGS. 7A and 7B, is a schematic block diagram showing a transmultiplexer type demultiplexer which is included in the onboard transponder;

FIG. 10, shown in interconnected FIGS. 10A and 10B, is a schematic block diagram of a receive intermediate frequency (IF) circuit which is included in a receiver of the mobile station;

FIG. 13, shown in interconnected

DESCRIPTION OF THE PREFERRED EMBODIMENT

Figure 1:
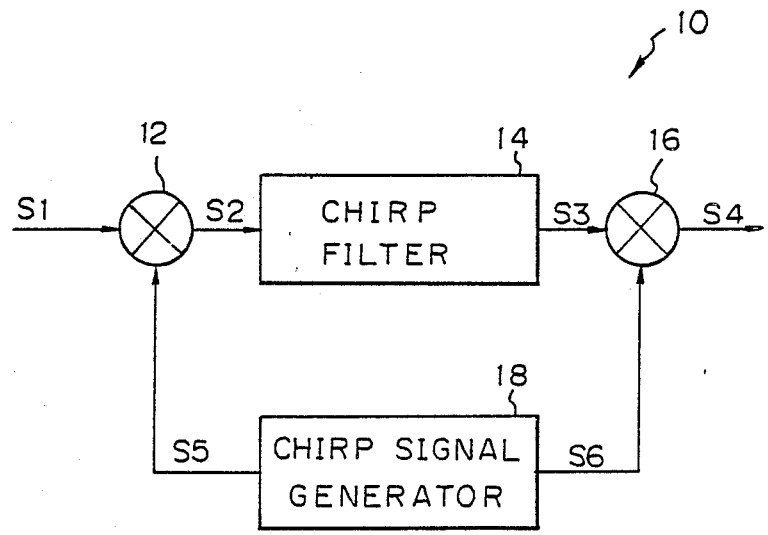
FIG. 1 is a schematic block diagram showing a chirp Z type FDM-TDM transmultiplexer of a prior art mobile satellite communication system.

To better understand the present invention, a brief reference will be made to a prior art mobile satellite communication system, shown in FIG. 1. Specifically, FIG. 1 schematically shows an FDM-TDM transmultiplexer 10 which converts an FDM signal into a TDM signal on a satellite by using the chirp Z conversion principle, as proposed by Nippon Telegraph and Telephone Co. As shown, the transmultiplexer 10 includes a mixer 12 to which an input intermediate frequency (IF) signal S1 is applied. An IF signal S2 swept by the mixer 12 is fed to a chirp filter 14. A mixer 16 is supplied with an output signal S3 of the chirp filter 14 and in turn generates an output baseband signal S4. A chirp signal generator 18 delivers a first chirp signal S5 to the mixer 12 and a second chirp signal S6 to the mixer 16.

Figure 3A:
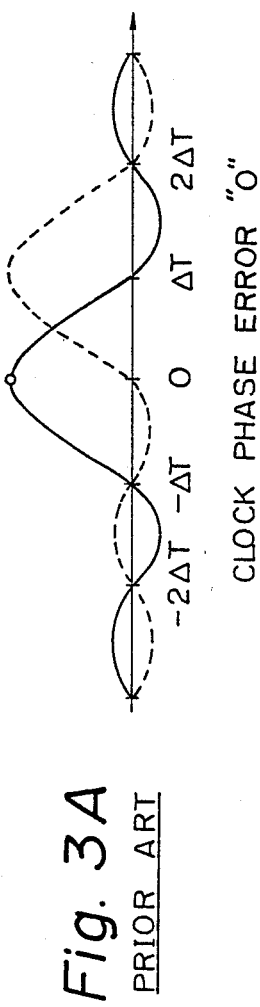
FIGS. 3A to 3B are diagrams exemplarily showing signal waveforms which are produced by the chirp Z type FDM-TDM transmultiplexer of FIG. 1.
Figure 3B:
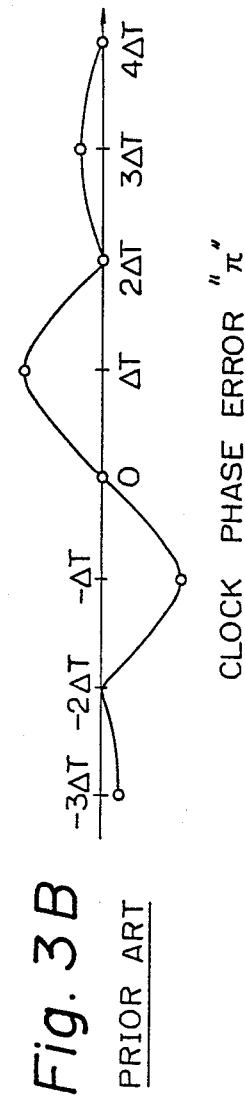

FIGS. 2A to 2F are representative of the operation of the transmultiplexer 10 shown in FIG. 1 while FIGS. 3A and 3B show the waveforms of signals which have been produced by the transmultiplexer 10. In the case shown in FIGS. 2A to 2F, the chirp filter 14 has a delay characteristic (referred to as dispersion characteristic hereinafter) which is proportional to the frequency, so that FDM-TDM translation is effected by the operation of FIGS. 2A to 2B very smoothly. The waveforms of TDM signals acutally produced by the transmultiplexer 10 are shown in FIGS. 3A and 3B. While each TDM channel signal has a finite time width as shown in FIGS. 2A to 2F, the actual waveform is etended in a sin x/x configuration on the time axis as shown in FIGS. 3A and 3B. Since the waveform periodically becomes "0 (zero)", time-division-multiplexing without interchannel interference is achievable by selecting a frequency step $\Delta f$ and the dispersion characteristic (chirp ratio) such that a TDM signals on other channels appear at the zero points. However, this holds true only when the period of data on each channel is coincident with the period of the chirp signal S5 shown in FIG. 2B with respect to phase. If the timing of data on one channel is not phase-locked with the period of the chirp signal, the signal waveform undergone FDM-TDM conversion is brought out of the sin x/x configuration to cause crosstalk between various channels. Especially, when such a timing phase error is "$\pi$", not only a signal does not appear at a time position of an expected channel but also the time positions of nearby channels suffer from the maximum interference.

A prerequisite with chirp Z conversion, therefore, is that the data timing of each channel be synchronized to the sweeping period on a satelite with respect to phase, resulting in considerable difficulty in the operation aspect. Furthermore, it will be clear the system cannot transmit analog signals without causing interchannel interference.

Figure 4:
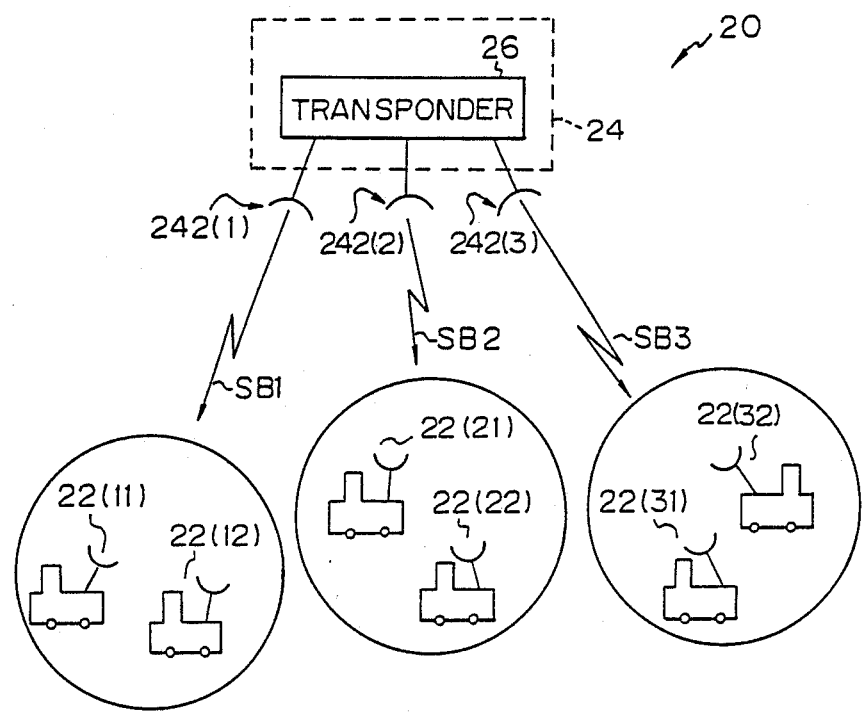
FIG. 4 is a schematic view showing one embodiment of the mobile satellite communication system in accordance with the present invention.
Figure 5:
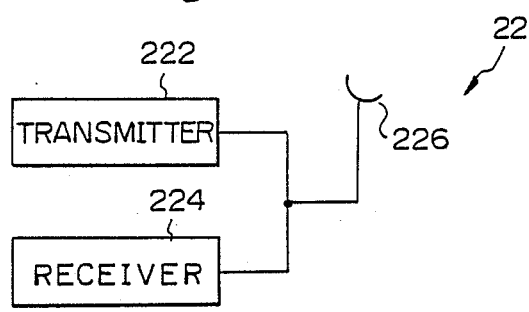
FIG. 5 is a block diagram schematically showing a mobile station which is included in the satellite communication system of the present invention.

Referring to FIG. 4, a mobile satellite communication system embodying the present invention is shown and generally designated by the reference numeral 20. FIG. 5 is a schematic block diagram showing one of mobile stations or terminals which are included in the system of FIG. 4. As shown in FIG. 4, the system 20 comprises a plurality of mobile stations 22 (11) and 22 (12), 22 (21) and 22 (22) and 22 (31) and 22 (32) which are situated on the earth, and a communication satellite 24 communicatable with the mobile stations 22 by sending radio signals over a plurality of spot beams $SB_1$ to $SB_3$. As shown in FIG. 5, each mobile station 22 includes a transmitter 222 for modulating voice and data to produce an FDM signal and transmitting it to the satellite 24 over the beam SB, a receiver 224, and an antenna 226 connected to the transmitter 222 and receiver 224. On the other hand, the satellite 24 includes an onboard transponder 26 which separates FDM signals from the mobile stations 22 and sets up beam connections to transmit signals over the spot beams $SB_1$ to $SB_3$ to expected mobile stations 22 via antennas 242 (1) to 242 (4).

In the illustrative embodiment, the transponder 26 includes demultiplexing circuits for individually separating received FDM signals on a channel basis by the transmultiplexer method, baseband matrix means for connecting outputs of the demultiplexing circuits to the spot beams SB which are to be transmitted, and transmitting means for time-division-multiplexing outputs of the baseband matrix means to produce a transmission frame and sending it as a TDM signal. The receiver 224 included in each mobile station 22 as previously stated is adapted to select a channel signal which it should receive out of the TDM signals which are sent from the transmitting means of the onboard transponder, and demodulates it to regenerate a signal. While three spot beams SB are shown in FIG. 4 and each is assigned to two mobile stations 22, the gist is that two or more spot beams SB are used and each is assigned to two or more mobile stations 22.

Figures 6, 6A:
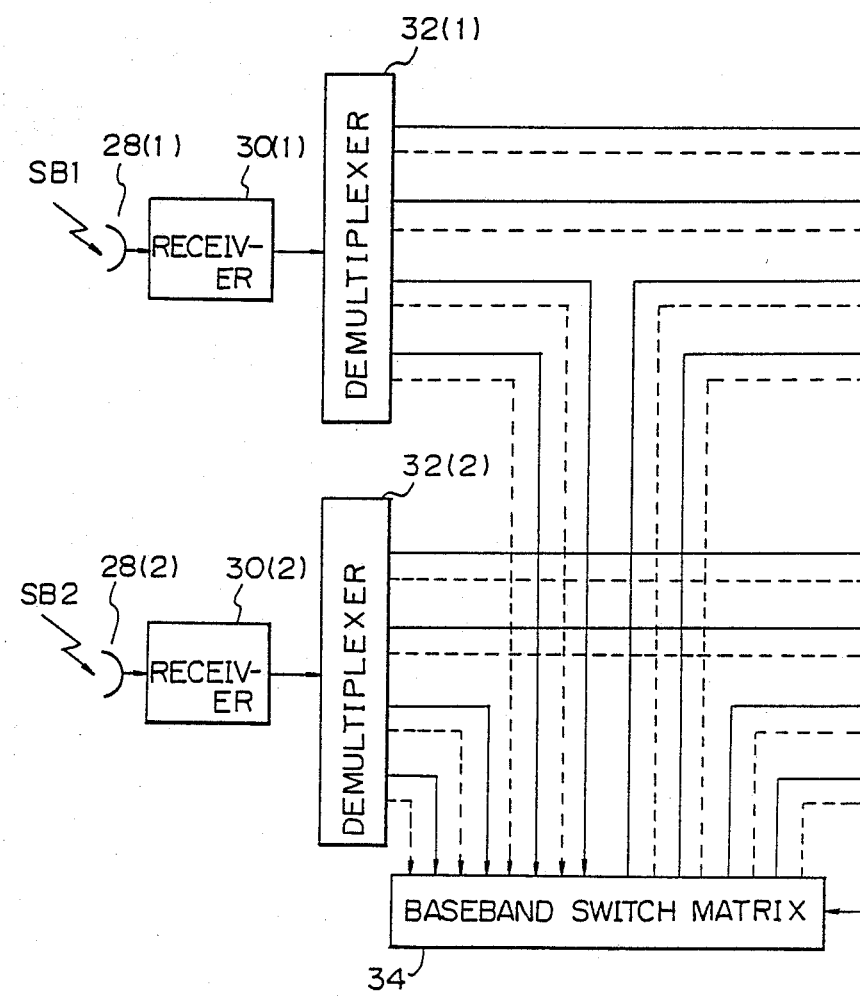
Figure 6:
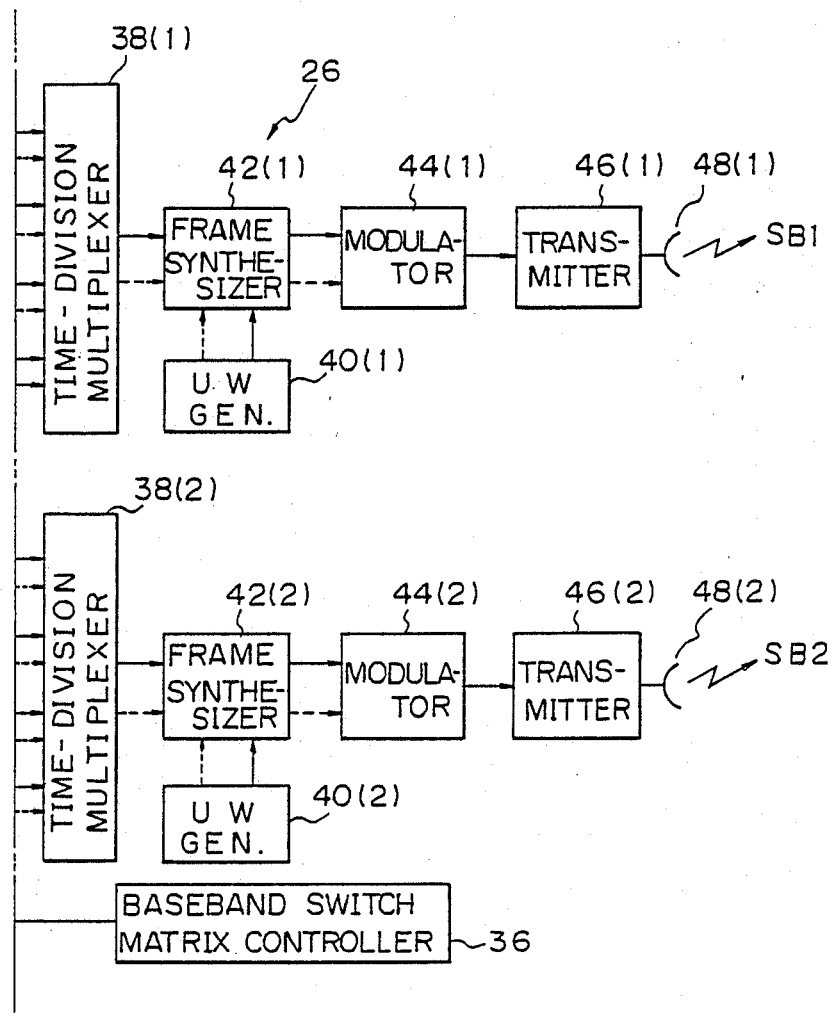
FIG. 6, shown in interconnected

Referring to FIG. 6, a specific construction of the onboard transponder 26 is shown and includes receive antennas 28 (1) and 28 (2) for receiving FDM signals over the beams $SB_1$ and $SB_2$, respectively. Outputs of the receive antennas 28 (1) and 28 (2) are respectively fed to receivers 30 (1) and 30 (2) each of which includes a low noise amplifier (LNA) and a downconverter. Transmultiplexer type demultiplexers 32 (1) and 32 (2) are provided for separating respectively the outputs of the receivers 30 (1) and 30 (2) on a channel basis and converting them into parallel baseband signals. A baseband switch matrix 34 connects the outputs of the demultiplexers 32 (1) and 32 (2) to the transmitting sections of the spot beams which should be transmitted individually. The baseband switch matrix 34 is controlled by a baseband matrix controller 36. Parallel outputs of the baseband switch matrix 34 are applied to time-division multiplexers 38 (1) and 38 (2) to be multiplexed thereby in response to a high-speed timing signal (multiplexing clock). Unique word (UW) generators 40 (1) and 40 (2) are adpated to generate unique words, i.e. fixed patterns. The outputs of the time-division multiplexers 38 (1) and 38 (2) and the outputs of the UW generators 40 (1) and 40 (2) are individually delivered to frame synthesizers 42 (1) and 42 (2) each serving to insert a UW at each multiplexing period to form a frame. Modulators 44 (1) and 44 (2) modulate a common carrier with the outputs of the frame synthesizers 42 (1) and 42 (2), respectively. Transmitters 46 (1) and 46 (2) each includes a high-power amplifier (HPA) for amplifying the output of the modulator 44 associated therewith approximately to the saturation point of a transmit amplifier, an upconverter, etc. Further, transmit antennas 48 (1) and 48 (2) are provided for sending respectively the outputs of the transmitters 46 (1) and 46 (2) to the downlinks of the spot beams $SB_1$ and $SB_2$. In FIG. 6, the solid lines and the dotted lines are representative of real portion signals and imaginary portion signals, respectively.

Figure 7B:
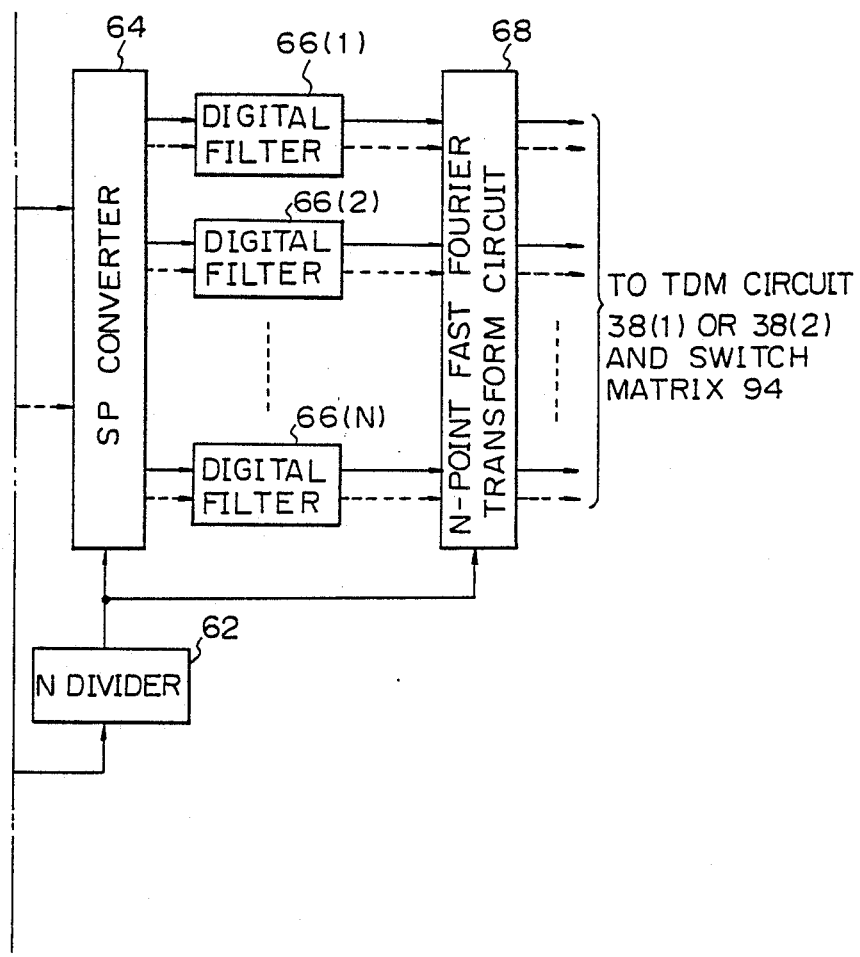
Figure 8:
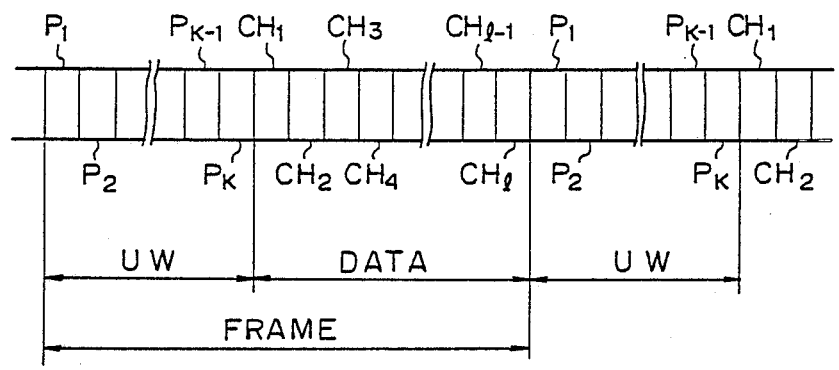
FIG. 8 shows a frame format of a TDM signal.
Figure 9:
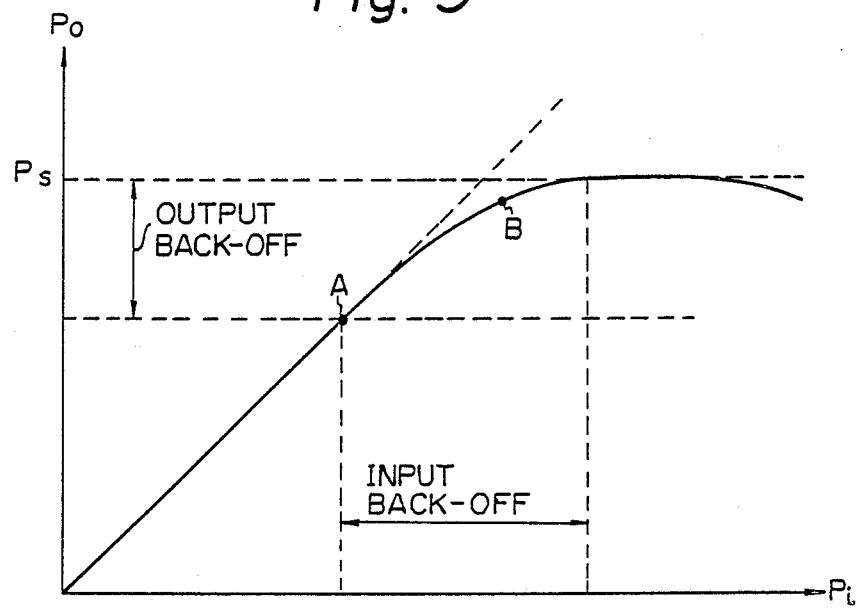
FIG. 9 is a graph showing the amplification characteristic and operation points of a transmitter which is included in the onboard transponder.

Referring to FIG. 7, a specific construction of the transmultiplexer type demultiplexer 32 which is included in the onboard transponder 26 of FIG. 6 is shown in a schematic block diagram. As shown, the demultiplexer 32 is made up of a local oscillator 50, a $\pi/2$ phase shifter 52, mixers 54 (1) and 54 (2), low-pass filters (LPF) 56 (1) and 56 (2), analog-to-digital (AD) converters 58 (1) and 58 (2), an oscillator 60 for oscillating a high-speed sampling clock, an N divider 62, a serial-to-parallel (SP) converter 64, digital filters 66 (1) to 66 (N), and an N-point fast Fourier transform circuit 68. In FIG. 7, the solid lines and the dotted lines are representative of real portion signals and virtual portion signals, respectively. FIG. 8 shows the frame format of a TDM signal. As shown, the frame format includes time slots $P_1$ to $P_k$ assigned to a unique word (UW) and time slots $CH_1$ to $CH_l$ assigned to data. FIG. 9 is representative of the amplification characteristic and operation points of the high-power amplifier which is included in each of the transmitters 46 (1) and 46 (2) of the transponder 26. In FIG. 9, A, B, $P_i$, $P_s$ and $P_o$ designate respectively the operation point associated with common amplification of FDM signals, the operation point associated with FDM-TDM translation, the input, the power at the saturation point, and the output.

The principle of construction shown in FIG. 6 is similarly applicable to a system which uses three or more beams. In FIG. 6, FDM signals received over the beams $SB_1$ and $SB_2$ are separated by the transmultiplexer type demultiplexers 32 (1) and 32 (2), respectively. More specifically, the demultiplexers 32 (1) and 32 (2) each being constructed as shown in FIG. 7 separate FDM channels by the filter banks which equivalently are arranged at each frequency step $\Delta f$ and then applies frequency conversion to the separated channels by using zero hertz for the center, thereby sampling the channels at a frequency of $\Delta f$. In this respect, each of the demultiplexers 32 (1) and 32 (2) plays two different roles at the same time, i.e., FDM demultiplexing by the filter bank and the converting the frequency to the baseband. The principle of a transmultiplexer is shown and described in detail in the previously discussed document. The transmultiplexer type demultiplexers 32 (1) and 32 (2) execute complex signal processing and all of their output signals are constituted by a pair of real portion signal and imaginary portion signal.

In FIG. 7, the solid lines and the dotted lines show real portion signals and imaginary portion signals, respectively. Among the output signals of the transmultiplexer type demultiplexers 32 (1) and 32 (2), the output signal which should be connected to the same spot beam SB is fed to the transmit section assigned to that spot beam, i.e. time division multiplexer 38 (1) or 38 (2). The output signal on another channel which should be connected to the other spot beam SB is connected to that spot beam SB via the baseband switch matrix 34. Generally, interchange is effected with respect to the spot beam SB to which a signal is to be connected and the channel number. The time-division multiplexers 38 (1) and 38 (2) individually multiplex parallel input signals (signal rate of $\Delta f$ samples/second) in response to the high-speed multiplexing clock (M which is an integral multiple of $\Delta f$). Further, unique words generated by the UW generators 40 (1) and 40 (2) are respectively inserted in the outputs of the multiplexers 38 (1) and 38 (2) by the frame synthesizers 42 (1) and 42 (2), whereby the frame shown in FIG. 8 is completed. In FIG. 8, assuming that the frame length is N, K time slots of the frame are constituted by a UW and L time slots are constituted by by data.

The modulators 44 (1) and 44 (2) shown in FIG. 6 are individually modulated by the frame of FIG. 8. The outputs of the modulators 44 (1) and 44 (2) are individually converted into the radio frequency (RF) band, then high-power amplified, and then sent toward the spot beams $SB_1$ and $SB_2$ via the transmit antennas 48 (1) and 48 (2) which are assigned to the downlinks. As shown in FIG. 6, this particular embodiment generates a single modulated wave. This allows a high-power amplifier of a satellite to be operated in the vicinity of a saturation point, as shown in FIG. 9. While the frequency-division-multiplexing system needs back-off as shown in FIG. 9, the illustrative embodiment eliminates the need for such back-off and therefore allows EIRP to be increased correspondingly. The increase in EIRP attainable with this embodiment usually amounts to 8 to 15 dB.

Figure 10B:
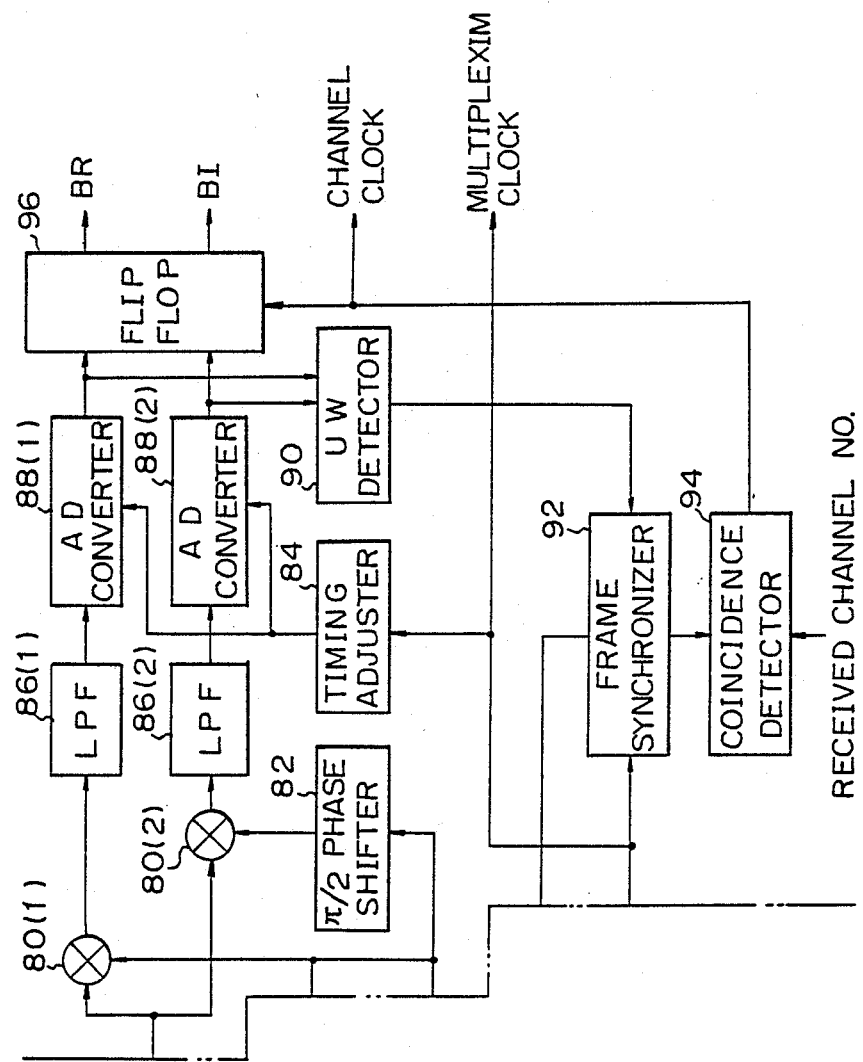

Referring to FIG. 10, there is shown a receive IF circuit 70 which is included in the receiver 224 of each mobile station 22 of the communication system 20. As shown, the receive IF circuit 70 includes a bandpass filter 72 having a predetermined band width for removing noise outside the IF band. A multiplexing clock recovery circuit 74 includes an envelope detector 740 for detecting the envelope of the output of the filter 72 to extract a multiplexing clock component, a tank 742 which is tuned to the multiplexing clock component, a phase comparator 744 for comparing the output of the tank 742 and a feed-back signal with respect to phase, a sampler 746 for sampling the output of the phase comparator 744 timed at the appearance timing of a UW portion, a loop filter 748 for smoothing the output of the sampler 746, and a clock voltage controlled oscillator (VCO) 750 for generating a clock signal in response to the output of the loop filter 748 and applying it to the phase comparator 744. A carrier recovery control circuit 76 includes a multiplier 760 for, when the unique word portion has undergone 2-phase PSK modulaton, multiplying the 2-phase PSK wave by 2 and, when the unique word portion has undergone 4-phase PSK modulation, multiplying it by 4 in order to remove the modulated component, a bandpass filter 762, a phase comparator 764, a sampler 766, a loop filter 768, and a multiplier 770. A carrier VCO 78 functions to recover a carrier under the control of a carrier recover controller 50. A mixer 80 (1) applies frequency conversion to the baseband signal of a real portion by multiplying the output of the bandpass filter 72 by that of the carrier VCO 78. A $\pi/2$ phase shifter 82 shifts the output of the clock VCO 78 by $\pi/2$ with respect to phase. A mixer 80 (2) applies frequency conversion to the baseband signal of an imaginary portion by multiplying the output of the bandpass filter 72 by that of the $\pi/2$ phase shifter 82. A timing adjuster 84 is supplied with the multiplexing clock signal from the VCO 750 to set up an optimum sampling timing. LPFs 86 (1) and 86 (2) are adapted to limit respectively the outputs of the mixers 80 (1) and 80 (2) with respect to band. AD converters 88 (1) and 88 (2) sample respectively the outputs of the LPFs 86 (1) and 86 (2) with the output of the timing adjuster 84 to thereby convert them into digital signals. A UW detector 90 detects a unique word on the basis of the polarity bits of the outputs of the AD converters 88 (1) and 88 (2). A frame synchronizer 92 responds to a UW detection pulse from the UW detector 90 and the output of the clock VCO 750 for setting up frame synchronization and delivering sampling pulses to the samplers 746 and 766. A coincidence detector 94 is supplied with the output of the frame synchronizer 92 to decode a receive channel number, thereby outputting a channel clock. Further, a D-type flip-flop 96 selects a channel signal to be received out of the outputs of the AD converters 88 (1) and 88 (2) in response to the output of the coincidence detector 94.

The recovery of the multiplexing clock is performed as follows. It is to be noted that in the frame format shown in FIG. 8 digital modulation is effected only in the UW portion and, hence, a clock and a carrier cannot be recovered by digital signal demodulation except at the UW portion. While FIG. 10 shows a circuit arrangement for recovering both of a clock and a carrier, it is usually not necessary to recover a carrier with such an arrangement. More specifically, the carrier VCO 78 may be implemented by a fixed oscillator and, therefore, the carrier recover controller 76 shown in FIG. 10 is not essential.

The operation of the sample type multiplexing clock recovery circuit 74 will be described. The bandpass filter 72, envelope detector 740 and tank 742 cooperated to extract a clock component. The output of the clock VCO 750 is compared with the extracted clock by the phase comparator 744 with respect to phase. The output of th phase comparator 744 is sampled by the sampler 746 at the timing at which a UW portion appears and used to control the clock VCO 750 via the loop filter 748. The carrier recovery circuit is operated in the same manner as the clock recovery circuit 74 except that the multiplier 760 executes doubling when a UW portion has been 2-phase PSK modulated and quadrupting when it has been 4-phase PSK modulated. The output of the bandpass filter 72 is subjected to frequency conversion at the two mixers 80 (1) and 80 (2) to become baseband signals which are individually associated with the real portion and the imaginary portion. The outputs of the mixers 80 (1) and 80 (2) are respectively limited in band by the LPFs 86 (1) and 86 (2) and then subjected to AD conversion at the AD converters 88 (1) and 88 (2). More specifically, the AD converters 88 (1) and 88 (2) individually sample the input data with the reoovered multiplexing clock to thereby convert them into digital data. The sampling timing is adjusted by the timing adjuster 84 to an optimum timing.

The polarity bits of the outputs of the AD converters 88 (1) and 88 (2) are fed to the UW detector 90 to detect a UW. In response to a UW detection signal, the frame synchronizer 92 establishes receive frame synchronization. The frame synchronizer 92 outputs sampling pulses so that the samplers 746 and 766 extract respectively a phase error signal associated with the clock and a phase error signal associated with the carrier out of the UW portion, whereby the clock and the carrier are recovered. The timing of the frame synchronizer 92 is decoded to generate a channel clock. By using the channel clock, a flip-flop 96 selects a signal on the channel to be received out of the outputs of the AD converters 88 (1) and 88 (2) and delivers it to the a basepand processing circuit.

Figure 11:
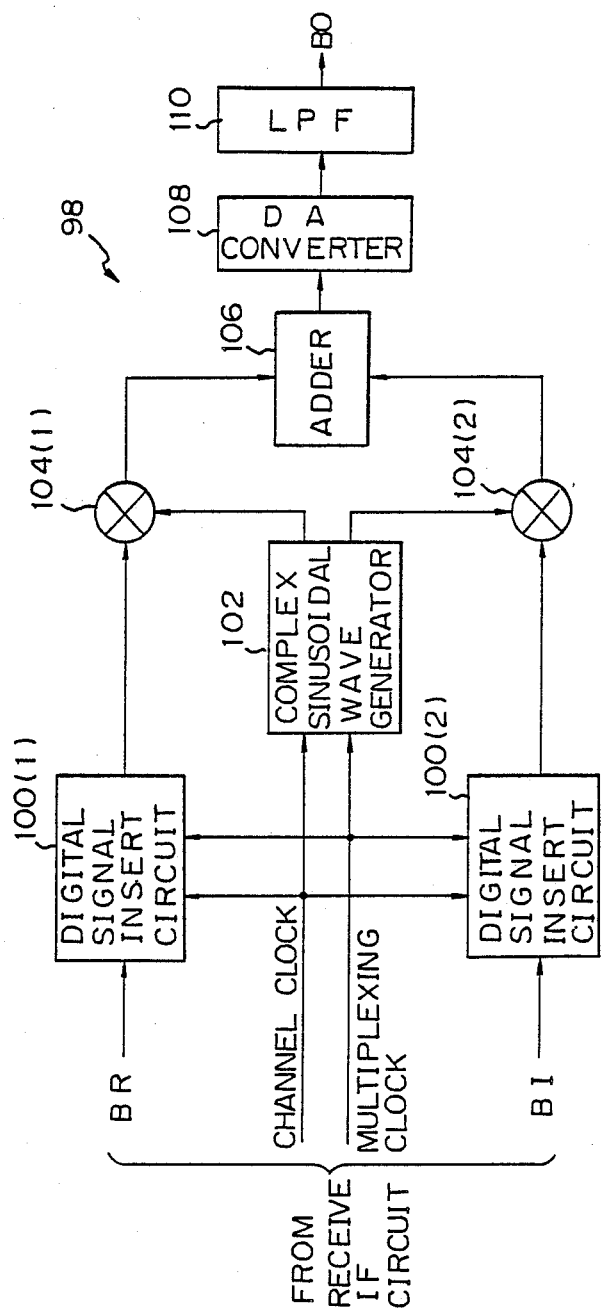
FIG. 11 is a block diagram schematically showing a baseband processing circuit included in the receiver of the mobile station for processing an SSB voice signal.

Referring to FIG. 11, there is shown a baseband processing circuit which is included in the receiver 224 of the mobile station 22 of the illustrative embodiment for processing an SSB voice signal. As shown, the processing circuit includes a digital signal inserting circuit 100 (1) for inserting a real portion baseband signal BR, a channel clock and a multiplexing clock which are applied thereto. A digital signal inserting circuit 100 (2) inserts an imaginary portion baseband signal BI, a channel clock and a multiplexing clock which are fed thereto. A complex sinusoidal wave generator 102 is supplied with a channel clock and a multiplexing clock to generate a sine local signal which is half the frequency of the channel clock and a cosine local signal. A multiplier 104 (1) multiplies the output of the signal inserting circuit 100 (1) and the sine local signal from the complex sinusoidal wave generator 102. A multiplier 104 (2) multiplies the output of the signal inserting circuit 100 (2) and the cosine local signal from the complex sinusoidal wave generator 102. The outputs of the multipliers 104 (1) and 104 (2) are added by an adder 106. A digital-to-analot (DA) converter 108 converts the digital output of the adder 106 into an analog signal. An LPF 110 is provided for removing high-frequency components from the output of the DA converter 108, thereby outputting a continuous recovered voice signal BO.

Figure 12A:
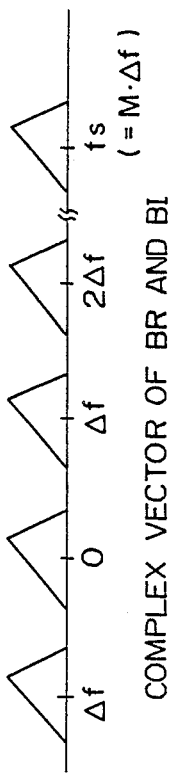
FIGS. 12A to 12D are diagrams demonstrating the regenerating operation of the baseband processing circuit shown in FIG. 11.
Figure 12B:
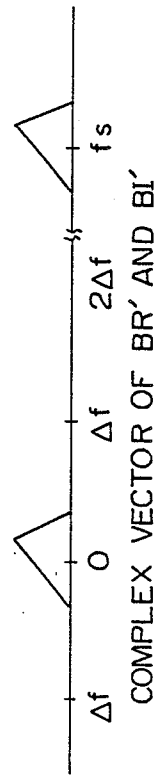
Figure 12C:
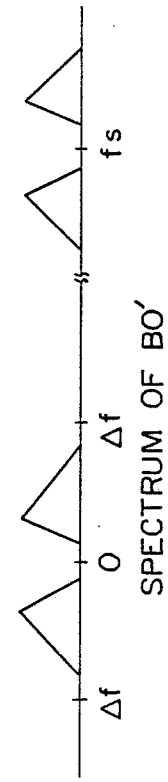
Figure 12D:
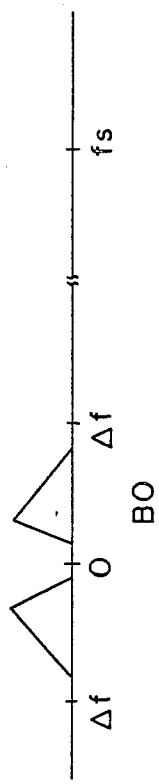

FIGS. 12A to 12D demonstrate the operation of the baseband processing circuit 98 stated above. How a voice signal that has undergone analog modulation is regenerated will be described with reference to FIGS. 11 and 12A to 12D. A real portion baseband signal BR and an imaginary portion baseband signal BI are sampled at the sampling frequency of $\Delta f$ and therefore have a repetitive spectrum as shown in FIG. 12A. Digital insertion increases the repetition period as represented by $fs=M.\Delta f$ and as shown in FIG. 12B. The spectrum of the resulting repetitive period is SSB and therefore asymmetric with respect to the positive and negative frequency axis. In light of this, the complex sinusoidal wave generator 102 generates a sinusoidal wave whose frequency is $\Delta f/2$ so that a voice spectrum is obtained in a correct frequency band as a result of complex multiplication by the multipliers 104 (1) and 104 (2) and adder 106, as shown in FIG. 12C. The resulting sequence is still a sample sequence. Hence, this sample sequence is routed through the DA converter 108 and analog LPF 110 to become a continuous signal, i.e. regenerated voice signal BO as shown in FIG. 12D.

Figure 13A:
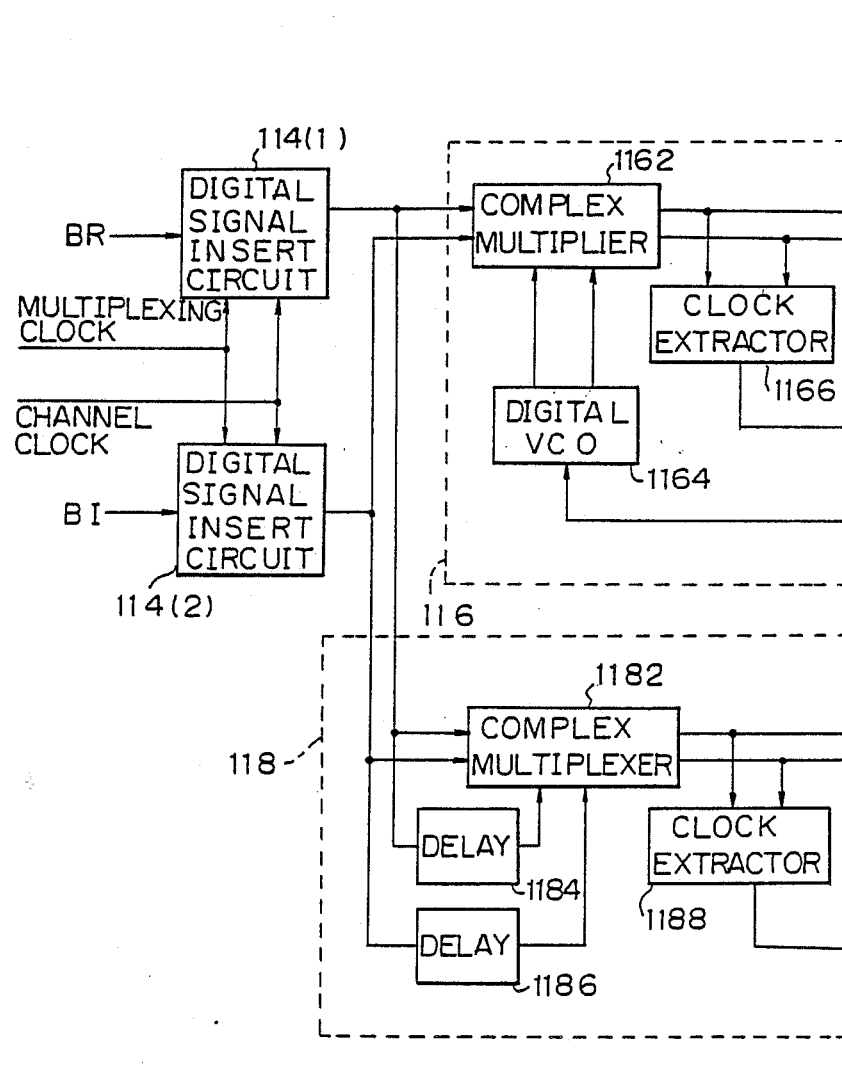
FIGS. 13A and 13B, is a block diagram schematically showing a baseband processing circuit included in the receiver of the mobile station for processing digital signals.
Figure 13B:
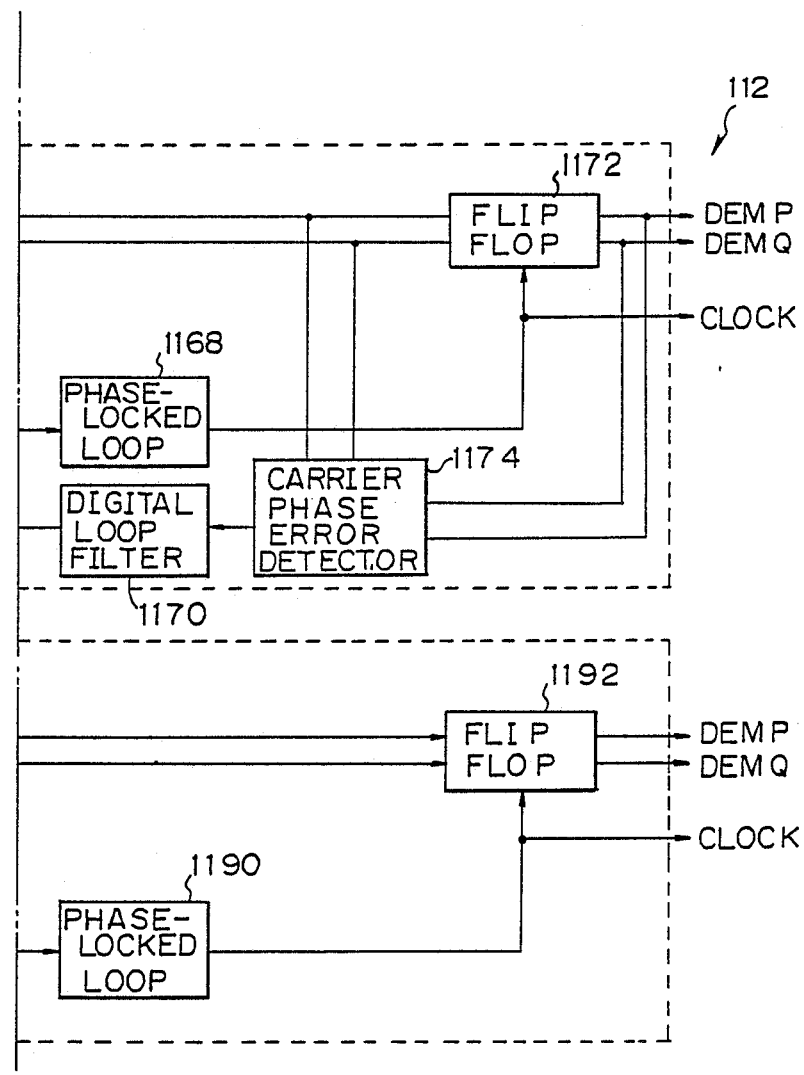

Referring to FIG. 13, a baseband processing circuit 112 included in the receiver 224 of the mobile station 22 for processing a digital signal is shown in a schematic block diagram. As shown, the processing circuit 112 includes a digital signal inserting circuit 114 (1) for inserting a real portion baseband signal BR, a channel clock and a multiplexing clock which are applied thereto. A digital signal inserting circuit 114 (2) inserts an imaginary portion baseband signal BI, a channel clock and a multiplexing clock which are fed thereto. A synchronous detecting and demodulating circuit 116 is made up of a complex multiplier 1162 for demodulating the outputs of the signal inserting circuits 114 (1) and 114 (2) to thereby regenerate a signal, a digital VCO 1164, a clock extracting circuit 1166, a phase-locked loop 1168, a digital loop filter 1170, a D-type flip-flop 1172, and a carrier phase error detector 1174. A differential detecting and demodulating circuit 118 consists of a complex multiplier 1182 for demodulating the outputs of the digital signal inserting circuits 114 (1) and 114 (2) to thereby regenerate a signal, delay units 1184 and 1186, a clock extractor 1188, a phase-locked loop 1190, and a D-type flip-flop 1192. The operation of the baseband processing circuit 112 shown in FIG. 13 is analogous to the operation for demodulating an ordinary PSK modulated signal.

Figure 14:
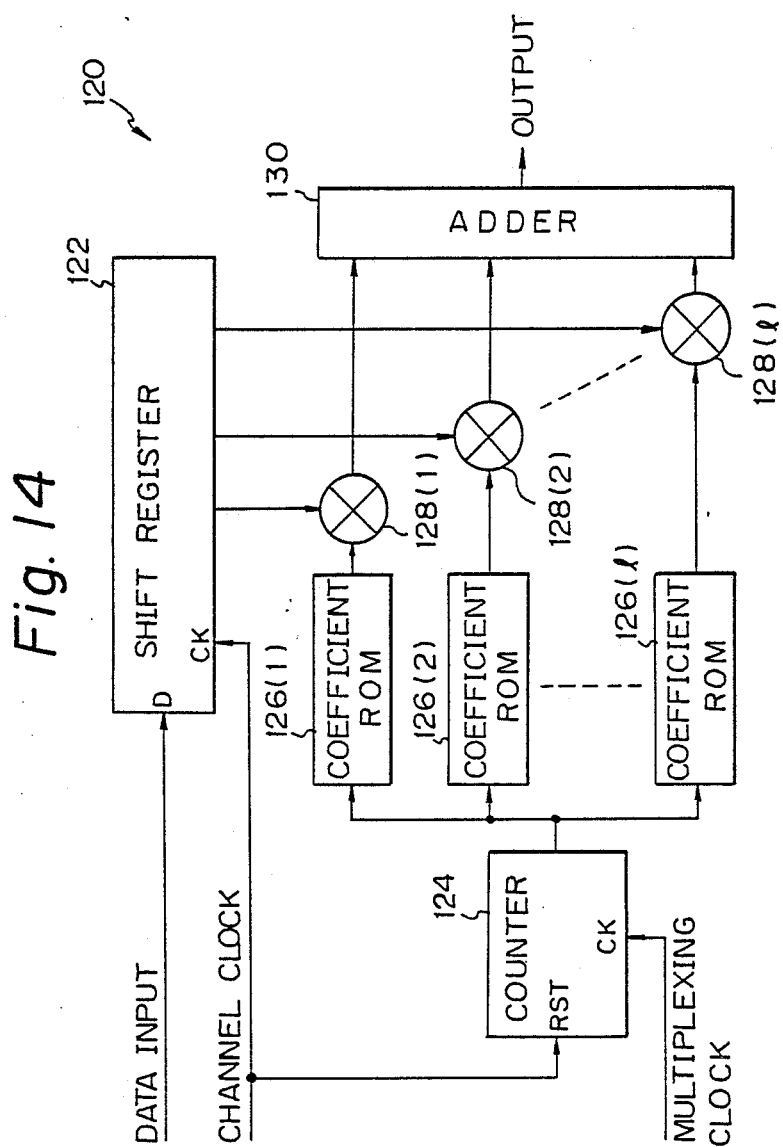
FIG. 14 is a schematic block diagram showing a digital inserting circuit.

FIG. 14 shows a digital inserting circuit installed in the communication system 20. As shown, the digital inserting circuit 120 is made up of a shift register 122, a counter 124, read only memories (ROMs) 126 (1) to 126 (l) each storing a tap coefficient, multipliers 128 (1) to 128 (l), and an adder 130.

Figure 15:
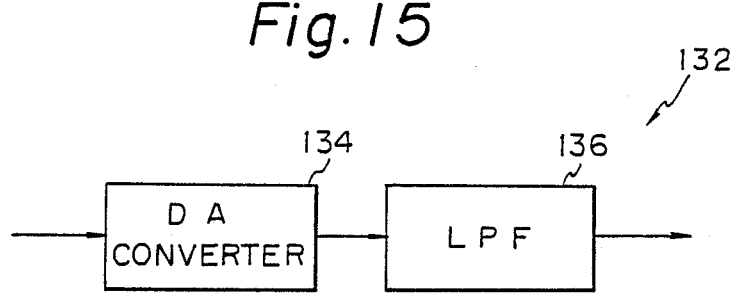
FIG. 15 is a schematic block diagram showing an analog inserting circuit.

FIG. 15 shows an analog inserting circuit also installed in the communication system 20. As shown, the analog inserting circuit 132 is comprised of a DA converter 134 and an LPF 136.

Figure 16:
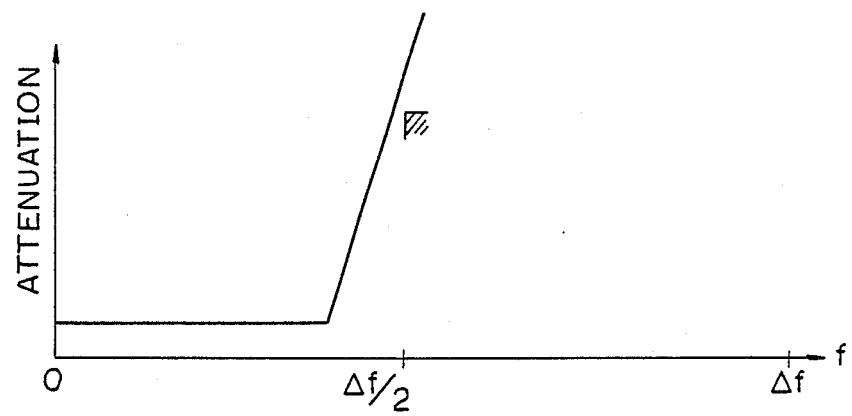
FIG. 16 is a plot representative of the frequency characteristic of the analog inserting circuit.

FIG. 16 is a plot showing the frequency characteristic particular to the analog inserting circuit 132 of FIG. 15.

In summary, the present invention achieves various advantages as enumerated below:

(1) Since FDM-TDM translation is effected on a satellite, a high-power amplifier can be used approximately at its saturation point so as to enhance EIRP of downlinks;

(2) Due to the use of a transmultiplexer-type demultiplexer, a signal can be readily interconnected between different spot beams by using a baseband matrix;

(3) A transmultiplexer-type demultiplexer allows narrow band channels to be separated on a satellite and, only if the signal band width lies in the channel band, allows both of an analog modulated signal and a digital modulated signal to be passed as desired, i.e., a transparent communication path is attained; and (4) Thus, a simple and yet high quality voice and data channels are afforded to a number of mobile stations which may be distributed over a considerably wide area to which a plurality of beams are assigned.

What is claimed is:

1. In a satellite communication system including a plurality of mobile stations situated on the earth and a communication satellite communicatable with said mobile stations by using radio signals over a plurality of spot beams, the combination with the foregoing, comprising:

said mobile stations each comprising a transmitter for modulating voice and data to produce a frequency-division-multiplexed (FDM) signal and transmitting said FDM signal to said communication satellite over any of the spot beams which is associated with said mobile station; and said communication satellite comprising an onboard transponder for separating FDM signals which are sent from said mobile stations from each other, time-division-multiplexing the resulting separated signals, and then respectively interconnecting the spot beams to transmit the resulting time-division-multiplexed signals to said mobile stations for which said FDM signals are meant.

2. A satellite communication system as claimed in claim 1, wherein said transponder comprises demultiplexing means for demultiplexing the received FDM signals on a channel basis, baseband matrix means for connecting outputs of said demultiplexing means to the beams over which said FDM signals are to be transmitted, and transmitting means for time-division-multiplexing outputs of said baseband matrix means to produce a transmit frame and transmitting said transmit frame as a time-division-multiplexed (TDM) signal.

3. A satellite communication system as claimed in claim 2, wherein said mobile stations each comprises a receiver for selecting a channel signal to be received out of the TDM signal which is sent from said transmitting means of said transponder, and demodulating said channel signal to regenerate a signal.

4. A satellite communication system as claimed in claim 3, wherein said transponder further comprises a receive antenna for receiving the FDM signals and a receiver for receiving an output of said receive antenna.

5. A satellite communication system as claimed in claim 4, wherein said demultiplexing means of said transponder comprises a transmultiplexer-type demultiplexer for separating outputs of said receiver on a channel basis to convert said outputs into parallel baseband signals.

6. A satellite communication system as claimed in claim 5, wherein said baseband matrix means of said transponder comprises a baseband switch matrix for connecting outputs of said transmultiplexer-type demultiplexer to sections for transmitting the beams which are individually associated with said outputs, and a baseband switch matrix controller for controlling said baseband switch matrix.

7. A satellite communication system as claimed in claim 6, wherein said transmitting means of said transponder comprises a time division multiplexer for time-division-multiplexing parallel outputs of said baseband switch matrix with a high-speed timing signal, a unique word (UW) generator for generating a unique word, a frame synthesizer supplied with outputs of said time division multiplexers and outputs of said UW generator for inserting a unique word at each multiplexing period to form a frame, a modulator for modulating a transmit carrier with an output of said frame synthesizer, a high-power amplifier for high-power amplifying an output of said modulator, a transmitter, and a transmit antenna for transmitting an output of said transmitter to a downlink of any of the spot beams.

* * * * *